United States Patent

Fort et al.

[15] 3,688,210

[45] Aug. 29, 1972

[54] APPARATUS TO PROTECT A PHASE-LOCKED-LOOP AGAINST LOSS OF SYNCHRONIZING SIGNAL

[72] Inventors: Larry W. Fort, 1217 E. Hartford, Broken Arrow, Okla. 74012; Connie T. Marshall, Rt. 5, Box 365, Muskogee, Okla. 74401

[22] Filed: July 16, 1971

[21] Appl. No.: 163,178

[52] U.S. Cl. ....................................331/1 A, 331/14

[51] Int. Cl. ..............................................H03b 3/04

[58] Field of Search ...........................331/1 A, 14, 25

[56] References Cited

UNITED STATES PATENTS 3,602,834 8/1971 McAuliffe..................331/1 A

*Primary Examiner*—John Kominski
*Attorney*—James R. Head et al.

[57] ABSTRACT

In this invention a phase-locked-loop has a phase detector which is prevented from passing negative pulses from a first to second terminal, to lower the frequency of the clock signal, whenever synchronizing signal is lost. The synchronizing signal goes to a monostable flip-flop, that puts out a reset signal to a flip-flop, that provides a positive gate enable signal. The negative pulses from the first terminal of the phase detector go through an inverter to one input of a NAND gate, the positive gate enable signal goes to the second input. The output of the gate goes to the second terminal of the phase detector. The flip-flop is continuously set (removing the gate enable signal) and reset (regaining the gate enable signal) so long as the synchronizing signal is present. When the synchronizing signal is lost, the flip-flop is not reset and the gate enable signal is lost until the synchronizing signal returns.

4 Claims, 1 Drawing Figure

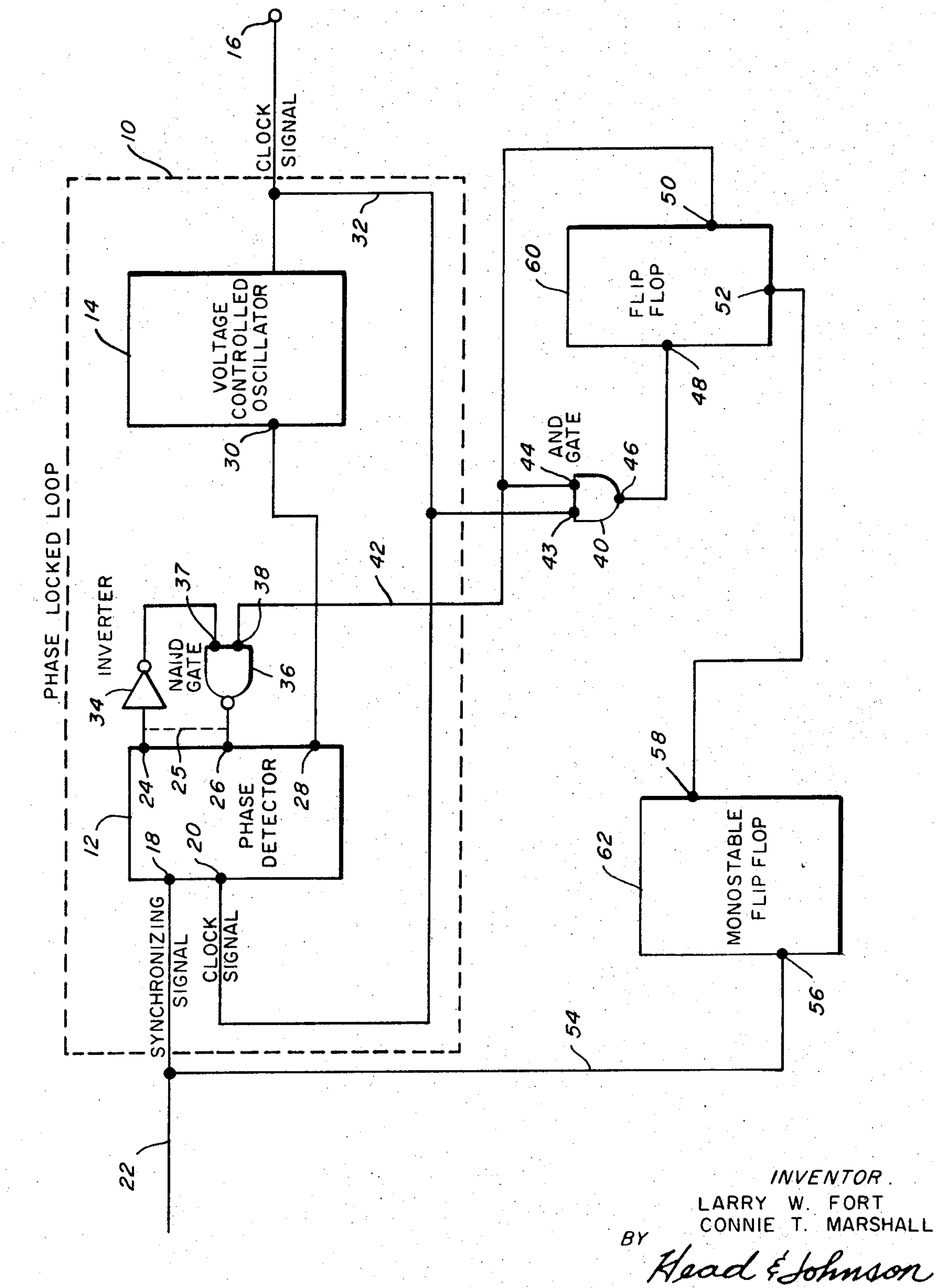
INVENTOR.
LARRY W. FORT
CONNIE T. MARSHALL
BY Head & Johnson
ATTORNEYS

APPARATUS TO PROTECT A PHASE-LOCKED-LOOP AGAINST LOSS OF SYNCHRONIZING SIGNAL

BACKGROUND OF THE INVENTION

1. Field of the Invention

This invention is in the field of phase-encoded signals and is related particularly to the phase detector portion of a phase-locked-loop used to derive a clock signal from the synchronizing signal. More particularly, this invention is concerned with means to disable the down-frequency control of the phase detector whenever synchronizing signal is lost.

2. Description of the Prior Art

In the prior art it is common to use phase encoded signals in communication and in data recording, etc. In such systems it is necessary to derive, from the phase-encoded signal a clock signal, the frequency of which is synchronized with the phase changes in the phase encoded signal. This generally utilizes a phase-locked-loop which includes a phase detector and a voltage controlled oscillator. The oscillator output signal (clock signal) is continuously compared with the incoming synchronizing signal. Depending on the difference in phase of the two signals an error signal is generated, the magnitude of which controls the oscillator to raise or lower the frequency of the clock signal, so as to synchronize it with the synchronizing signal.

One weakness of such a system is that if the synchronizing signal should be lost momentarily, the phase detector interprets this as a very low frequency signal, and it begins generating an error voltage which will cause the clock frequency to decrease. This it does by generating negative pulses at a first terminal which must be passed to a second terminal to generate the proper error voltage to lower the frequency.

This lowering of the clock frequency whenever synchronizing signal is lost, is undesirable. What would be desired would be that the clock frequency would stay the same. Then, when the synchronizing signal came back on, the clock would be close enough in frequency so that it would lock-on. However, if the clock-frequency had been driven down, then it would be impossible to synchronize and lock-on the clock signal to the synchronizing signal.

SUMMARY OF THE INVENTION

These weaknesses of the prior art systems are overcome in this invention by providing a means responsive to the presence or absence of the synchronizing signal to pass or block the passage of negative pulses from the first to the second terminal of the phase detector. When the synchronizing signal is present, these negative pulses are passed. When the synchronizing signal is absent, these negative pulses are blocked, and they cannot get through to reduce the error voltage and lower the frequency. Consequently, the oscillator continues at the same frequency (except for normal drift). Then when the synchronizing signal returns, the clock signal can lock-on again.

It is therefore the object of this invention to provide a means to block the down-frequency drive of the oscillator when the synchronizing signal is lost.

These and other objects and a complete understanding of the principles and details of the invention will be evident from the following description taken in connection with the appended drawing, in which:

BRIEF DESCRIPTION OF THE DRAWING

The FIGURE illustrates the preferred embodiment of this invention.

DESCRIPTION OF THE PREFERRED EMBODIMENT

Referring now to FIG. 1, a portion of the circuit is shown enclosed in a dashed line 10, entitled phase-locked-loop (PLL). This is the same kind of PLL described and discussed in our copending application Ser. No. 163,208 and which is incorporated by reference into this application. This PLL has two principal components, the phase detector 12 and voltage controlled oscillator 14. The synchronizing signal which is to generate the clock signal comes by lead 22 to terminal 18 of the phase detector 12. The clock signal output from the voltage controlled oscillator appearing at 16 is the second input via lead 32 to terminal 20. The phase detector compares the phase of each of these signals and generates an error voltage which is a function of the frequency or phase difference, and transmits this error voltage from 28 to terminal 30 of the oscillator 14, which responds with an appropriate change in frequency.

When the clock frequency is to be reduced, negative pulses go from terminal 24 to terminal 26 of the phase detector. If the synchronizing signal at 18 should momentarily be lost, this is interpreted by the phase detector as a very low frequency. It puts out negative pulses from terminal 24 to terminal 26 through lead 25, shown dashed. These pulses cause the error voltage to reduce, and the oscillator 14 to lower its frequency. This is undesirable. If such a loss of signal should occur, what is desired is that the link 25 should be opened and the oscillator 14 permitted to continue to run at the same frequency it had just prior the loss of signal. Except for the drift in frequency that would normally take place, the oscillator then would be at about the same frequency, and when the synchronizing signal comes back on, the oscillator will be able to lock-on readily. The circuit of FIG. 1 is directed to the objective of opening the circuit between 24 and 26, so no pulses can get through, whenever synchronizing signal is lost.

The dashed lead 25 is removed. In its place an inverter 34 is connected from 24 to the NAND gate 36. The negative pulses at 24 become positive pulses at 37. If the pulses at 38 are also positive, then negative pulses will appear at 26, and normal action, equivalent to lead 25, will be present.

Positive pulses are put out of terminal 50 of flip-flop 60, whenever synchronizing signal is present. The signal on lead 54 to terminal 56 of monostable flip-flop 62 causes a negative pulse at 58 at each negative going transition in the synchronizing signal. This negative pulse goes to 52 and resets the flip-flop 60 to place a positive potential on 50.

At the same time this positive potential goes to terminal 44 of AND gate 40, and when clock potential is positive on 43, a pulse goes to 48 to cut off the positive potential on 50. However, the pulse from 58 controls (whenever it is present) and positive potential remains on 50 and on 38, so long as synchronizing signal is present. Thus the gate 36 is always enabled, and negative pulses from 24 can get through to 26.

Now, when synchronizing signal disappears, the pulse from 58 is not present, and the pulse from 46 to 48 sets the flip-flop and removes the positive potential from 50. Thus gate 36 is not enabled, and no pulses get through from 24 to 26. At the same time gate 40 is disabled since the potential of 44 drops to zero, and the flip-flop 60 remains with zero potential on 50 until the synchronizing signal returns and flip-flop 62 puts out its negative pulse and resets flip-flop 60.

While this invention has been described in terms of a phase detector 12, there are commercial devices on the market which detect phase and frequency, and these are very desirable in this application. Among such devices are models MC 4,024, MC 4,044, MC 4,324 and MC 4,344, which are manufactured by Motorola Semiconductor Products, Inc., of Phoenix, Arizona 85,036. Other manufacturers make similar devices any one of which could be used in this invention. Since these devices and the various gates and flip-flops are well known in the industry and can be purchased on the open market, and since they, in themselves, form no part of this invention, there is believed to be no need for further detailed description.

While this invention has been described with some particularity, it will be clear that from the principles which have been described, one skilled in the art will be able to devise many other embodiments, all of which are considered to be part of this invention which is not to be limited to the abstract, the description of the drawings, but is to have the scope of the appended claim or claims, when construed to the full equivalents of each element.

What is claimed:

1. In an apparatus for controlling a phase-locked-loop to prevent lowering of the frequency of its output clock signal in response to loss of synchronizing signal, said phase-locked-loop including a phase detector, in which the means to cause a decrease in frequency provides a control signal at a first terminal to be transmitted to a second terminal, the improvement comprising:

a. gate means to control the passage of said control signal from said first to said second terminal;

b. first means responsive to a negative-going transition in said synchronizing signal to create a pulse;

c. second means responsive to said pulse of said first means, for creating a gate-enable signal to said gate means; and d. third means responsive to said gate enable signal and said clock signal to disable said second means;

whereby said gate means is prevented from being enabled and said control signal is prevented from passing to said second terminal.

2. The apparatus as in claim 1 in which said gate means comprises a NAND gate, the output of which is connected to said second terminal, said first terminal connected through an inverter to the first input of said NAND gate, and the second input of said NAND gate receiving a positive gate enable signal, so long as said synchronizing signal is present.

3. The apparatus as in claim 2 in which said positive gate enable signal is provided by resetting a flip-flop, the resetting signal being received from a monostable flip-flop, whose input is connected to said synchronizing signal.

4. The apparatus as in claims 3 including said third means comprising an AND gate, the output of which provides the set signal to said flip-flop, and the two inputs to which comprise said clock signal and said positive gate enable signal.

* * * * *